United States Patent [19]

Malone et al.

[11] Patent Number: 5,109,983
[45] Date of Patent: May 5, 1992

[54] PACKAGE FOR AN OPTICAL FIBER JUMPER

[75] Inventors: James P. Malone, Middleton; Warren J. Biskupek, Aberdeen Township, Monmouth County; Edward B. Lurie, Matawan, all of N.J.

[73] Assignee: Minnesota Mining and Manufacturing Company, St. Paul, Minn.

[21] Appl. No.: 646,686

[22] Filed: Jan. 28, 1991

[51] Int. Cl.⁵ .................... B65D 85/671; B65H 55/00
[52] U.S. Cl. .................................. 206/408; 206/393; 206/409; 242/129; 242/159; 242/171; 350/96.2
[58] Field of Search ............... 350/96.2; 206/303, 388, 206/389, 393, 397, 408, 391, 392, 394, 409; 242/129, 159, 170, 171

[56] References Cited

U.S. PATENT DOCUMENTS

| | | | |
|---|---|---|---|
| 2,008,026 | 7/1935 | MacMurray | 206/408 |
| 2,646,196 | 7/1953 | York | 206/388 X |
| 3,352,412 | 11/1967 | Drawing et al. | 242/159 X |
| 3,512,634 | 5/1970 | Burch, Jr. | 206/391 |
| 3,933,087 | 1/1976 | Mattos | 206/394 X |
| 4,173,389 | 11/1979 | Curtis . | |
| 4,458,985 | 7/1984 | Balliet et al. . | |
| 4,666,240 | 5/1987 | Caron et al. . | |
| 4,702,551 | 10/1987 | Coulombe | 350/96.2 |
| 4,722,585 | 2/1988 | Boyer | 350/96.2 |
| 4,765,708 | 8/1988 | Becker et al. | 350/96.2 |
| 4,812,009 | 3/1989 | Carlisle et al. . | |
| 4,852,963 | 8/1989 | Lampert . | |
| 4,900,121 | 2/1990 | Becker et al. | 350/96.2 |
| 4,974,789 | 12/1990 | Milburn | 242/159 |

FOREIGN PATENT DOCUMENTS

| | | | |
|---|---|---|---|
| 0109854 | 4/1990 | Japan | 206/388 |
| 20978 | of 1902 | United Kingdom | 206/388 |

OTHER PUBLICATIONS

Photocopy of box cover, backing page and fiber package for AT&T Western Electric Lightguide Systems 1B-5 Pigtail (undated).
Photocopy of opposite sides of file for samples from Corning (undated).

Primary Examiner—Bryon P. Gehman
Attorney, Agent, or Firm—Gary L. Griswold; Walter N. Kirn; John C. Barnes

[57] ABSTRACT

A package for handling and shipping optical fiber jumpers which permit testing during manufacturing and by the end user, which package includes a sheet having allochiral halves each with cut-outs to form ears upon which to spirally wind a length of optical fiber having a connector plug formed on each end. The halves are folded together and subsequently the length of fiber bridging the fold line can be cut to provide two pigtails.

9 Claims, 3 Drawing Sheets

PACKAGE FOR AN OPTICAL FIBER JUMPER

BACKGROUND OF THE INVENTION

1. Field of the Invention

The invention refers to a package for the shipping and handling of lengths of optical fiber and in one aspect to a supply package for optical fiber jumpers including cable and connectors.

2. Description of Prior Art

Optical fibers are used extensively in the telecommunications and data transmission industry because they carry a vast amount of information. Typically the buffered fiber contains an 8 to 100 μm central glass core through which the optical signal is transmitted. The glass core is surrounded by a glass cladding which has a diameter of up to 250 μm. Usual cable, at least one additional plastic coating is applied over the cladding. The cladding has a slightly different index of refraction than the core. Therefore, to eliminate degradation it is important when handling the optical fiber that it is not kinked or wrapped about a radius less than the recommended minimum bending radius of the fiber.

Optical fiber connectors, of the type illustrated for example in U.S. Pat. Nos. 4,173,389, 4,458,985, 4,812,009 and 4,852,963, are placed on a length of optical fiber in a manufacturing environment such that the optical fiber core is centered and sealed in the connector and the end of the fiber core is polished. This length of optical fiber with a connector at each end forms a "jumper." When the length of fiber of a jumper is cut it forms two "pigtails." Each pigtail is adapted to have its free end spliced to the end of a fiber for connecting an incoming or distribution line to the connector. As a jumper, the assembly is adapted to connect two optical fiber devices.

The product to be packaged is thus the jumper or two pigtails for supplying the field technicians with parts for making the fiber installations. The jumpers are tested before leaving the manufacturing site and often it is desirous for the end user to test the connectors and length of cable received. It is tested by connecting the connectors to a test fixture which sends a light signal through the jumper to measure for any losses in signal.

Known packaging systems for lengths of fiber and for a length of optical fiber and the associated connector, or connectors, include such things as forming the fiber into a coil, binding it with cable ties or the like and placing it in a zipper bag.

Alternative packaging systems include a plastic sheet with a vacuum formed annular recess formed in one side of the sheet of clear plastic in which the coil of optical fiber is placed with the connector or connectors extending therefrom into recesses formed along the marginal edges of the sheet. The coil of fiber is retained by a soft resilient annular foam material formed to fit in the recess to retain the fiber. A cardboard cover then closes the back of the vacuum formed plastic sheet and the foam, and the cover and sheet are placed in a box. The latter package describes a package used by AT&T for pigtails for fiber optic systems.

Additionally, samples of optical fiber have been packaged in a folded paper file having generally circular halves joined about a fold line and one of the halves of the file has punched cut ears, comprising spaced holes and an arcuate cut joining the holes, arranged in a pattern to receive a length of sample fiber. A closing tab is also formed on the same half opposite the fold which fits into a slit in the other half of the file. The sample length of fiber is wrapped on the ears and the other half of the file forms a cover which folds over the fiber and is held in position by the tab. This is a package used currently by Corning Glass Works of Corning, N.Y. for samples of optical fiber.

The packages of the prior art do not afford a convenient way of supplying a jumper in a manner to be tested, or of supplying pigtails. The packages of the prior art did not permit equal lengths or predetermined measured lengths of fiber to be readily supplied with each connector.

The package of the present invention affords a package in which the length of optical fiber with mounted connectors is wrapped to protect the fiber. The package allows testing of the jumper prior to and after shipping without handling of the fiber. The package allows separation of the jumper to form a pair of pigtails. The pigtails can have an equal length of fiber connected to each connector or predetermined different lengths. One pigtail can be removed from the package without disturbing the other.

SUMMARY OF THE INVENTION

The present invention comprises an optical fiber shipping and handling package useful for the shipping and handling of optical fiber jumpers. The package comprises a sheet of paperboard having a central fold line to form allochiral halves, i.e. right and left halves like the hands, with each half having mushroom shaped cut-outs arranged in a circular array with each array having a diameter exceeding twice the minimum bend radius for the optical fiber. The cut-outs afford supports for the wrapping of a length of optical fiber spirally on both halves with a connector at each end of the fiber. The halves each have a recess communicating with the recess in the other half, which recesses are formed as a slot extending across the fold line to permit the length of optical fiber extending across the fold line to be readily located and cut to separate the jumper into two separate lengths of fiber each with a connector attached.

DESCRIPTION OF THE DRAWINGS

The invention is explained in more detail with reference to the accompanying drawings wherein.

DETAILED DESCRIPTION OF THE INVENTION

Figure 1:
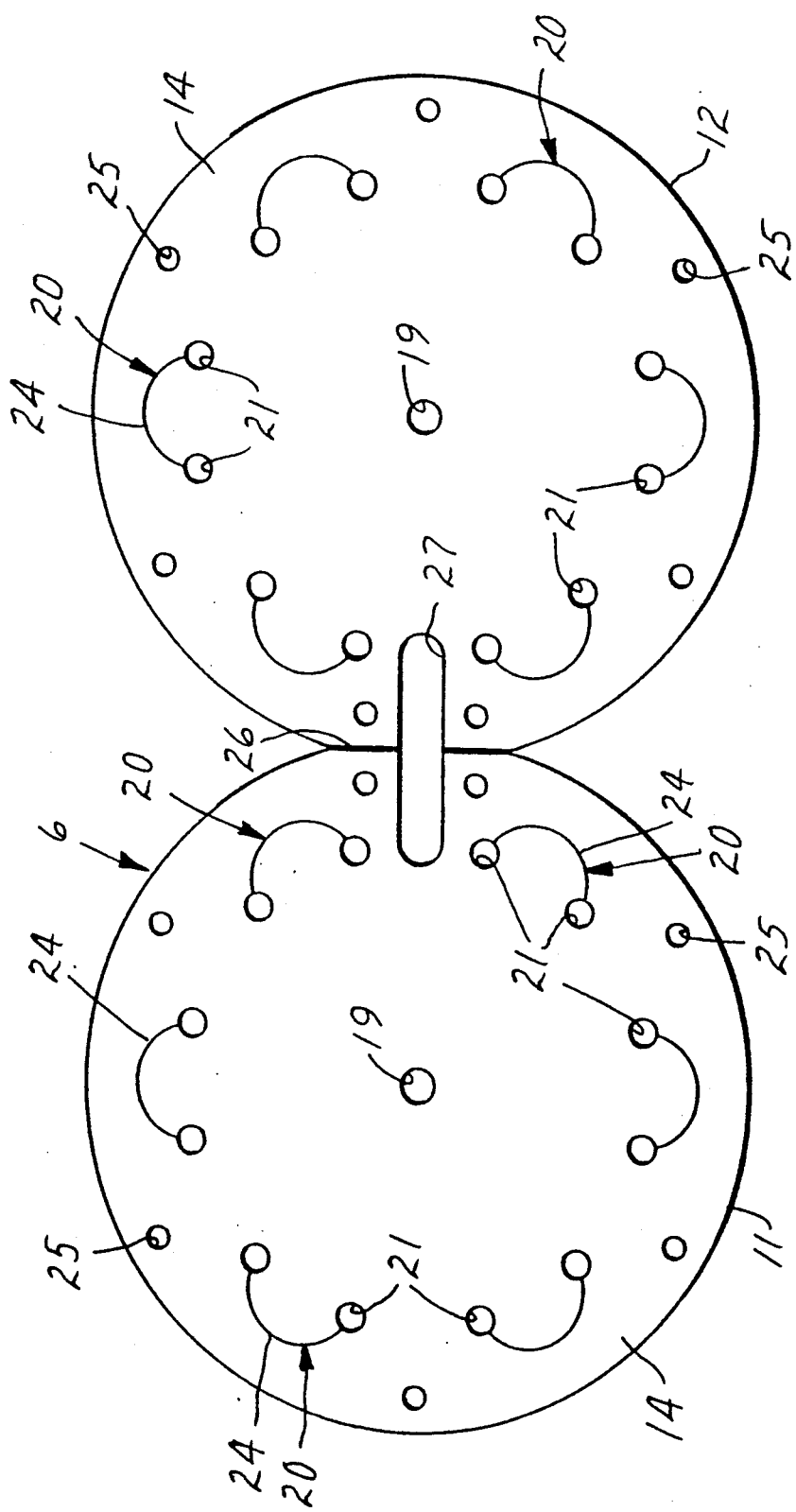
FIG. 1 is a plan view of the blank used for forming the package of the present invention.

The invention will be described with reference #to the drawing wherein like parts are identified by like reference numerals in and throughout the several views.

The package 5 according to the present invention comprises a paperboard blank 6, having two halves 11 and 12 joined along a fold line 26, a length of optical fiber 30, and a pair of connectors 31, one attached to each end of the fiber 30.

The blank 6 is formed from paperboard, although it could be formed from a sheet of polymeric material or sheet metal. The blank illustrated comprises two generally circular allochiral halves 11 and 12, i.e. symmetrical halves but reversed as one's hands, or mirror images, each with an inner surface 14 and an outer surface 16. Each half 11 and 12 has a central opening 19 and a plurality of mushroom shaped cut-outs 20 arranged in a circular array symmetrically about the opening 19. The cut-outs 20 are formed by an array of twenty four (24) small holes 21, 0.312 inch (8. mm) in diameter, positioned in spaced relationship on a circle having a diameter of 5.25 inches (13.3 cm). Each pair of the small holes 21 are connected by arcuate slits 24 having a radius of 0.625 inch (1.6 cm). The pairs of small holes are spaced on 1.25 inch (3.2 cm) centers. Each half 11 and 12 is also formed with small holes 25 positioned on a larger circle between and beyond the cut-outs 20.

The halves 11 and 12 are joined along the fold line 26 which is formed along a small chord of the circular halves 11 and 12. A slot 27 which extends across the fold line 26, and generally perpendicular thereto is formed in the blank to define a recess in each half of the blank 6 when the blank is folded along the fold line 26 to place the two surfaces 14 against each other.

Figure 2:
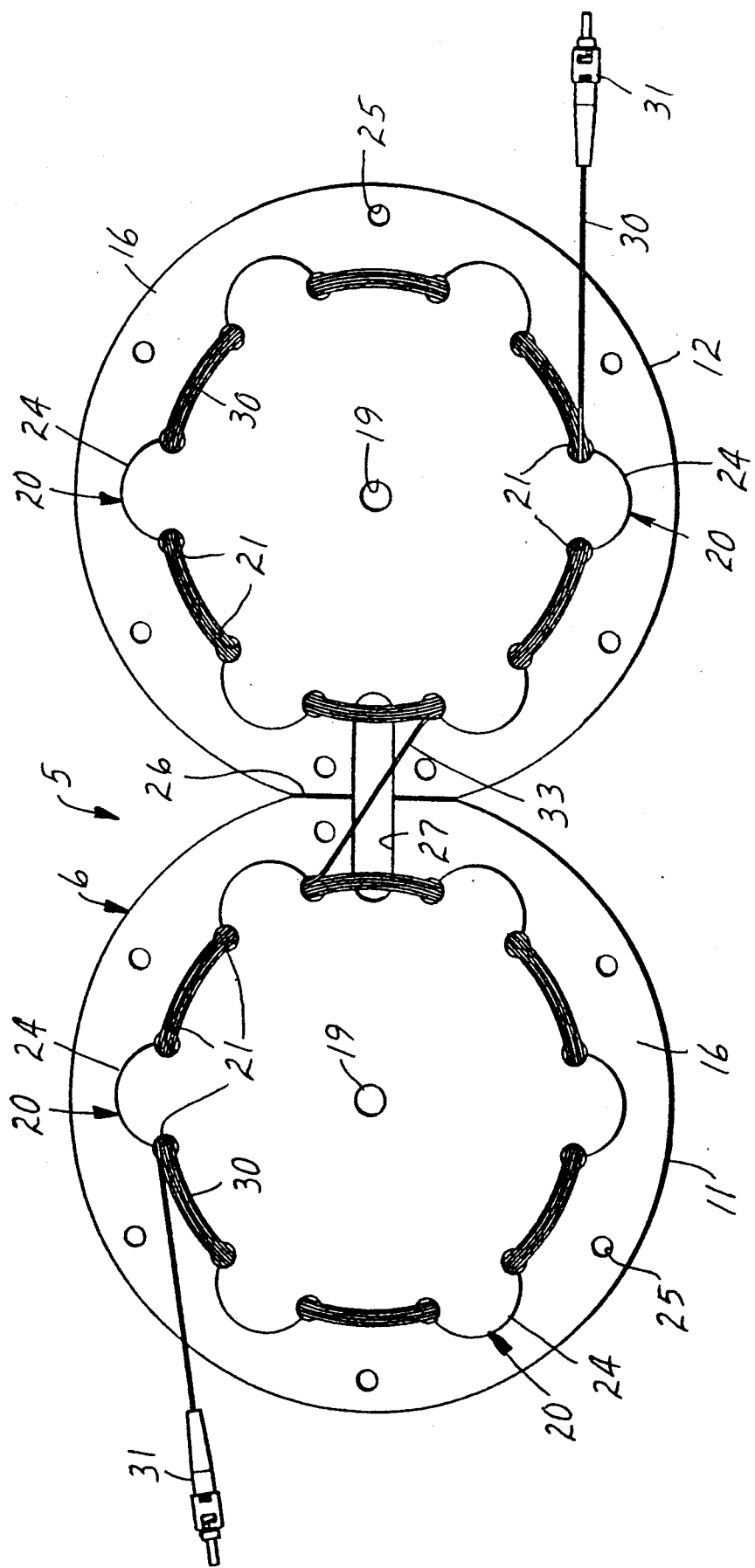
FIG. 2 is a bottom view of a package according to the present invention illustrating the blank with a length of optical fiber having connectors on each end and wound on the blank.
Figure 3:
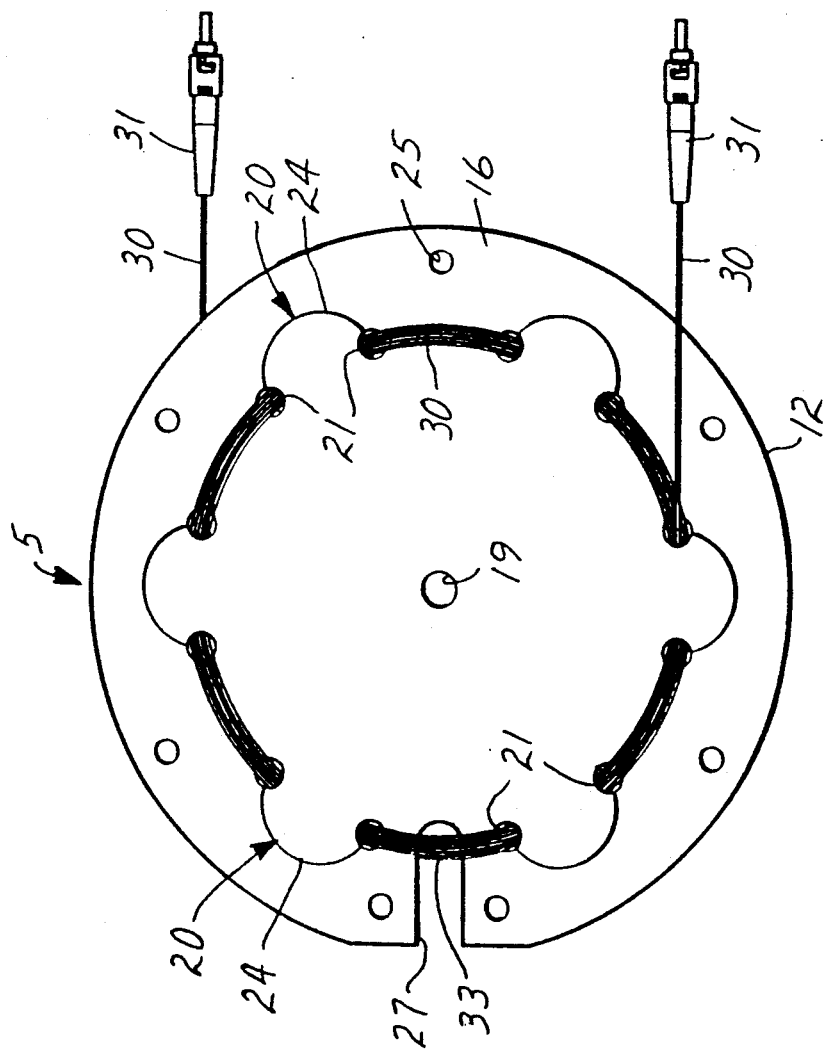
FIG. 3 shows a plan view of the package.

As shown in FIGS. 2 and 3, a length of buffered optical fiber 30, having a connector 31 attached to each end, is wound onto the blank 6 in a generally spiral configuration, by deforming the paperboard at the slits 24 such that the wound fiber 30 appears to be going in and out through the holes 21, with the connectors 31 extending away from the coils of fiber. The connectors 31 can be attached to the paperboard, as at holes 25, to restrict their movement by wire ties or similar ties.

With the halves 11 and 12 folded upon themselves about the fold line 26, the coils of fiber are disposed on the exterior surfaces 16 of the two halves 11 and 12 as illustrated in FIG. 3. In this position, the length 33 of fiber which spans the slot 27 is exposed in the recess formed when the halves are folded together. As the halves are subsequently opened, to expose the inner surfaces 14 of the package, this length 33 of fiber bridging the two halves is readily apparent and can be severed to form two separate pigtails.

The amount of fiber wrapped on each half of the blank can vary, but most commonly it will be equal lengths to form substantially identical pigtails. The length of fiber on one half of the package can however be longer or shorter, so 60% of the length of fiber 30 is on one half and 40% on the other. As the length of fiber increases it is desirable to increase the size of the holes 21 to accommodate the added coils of fiber.

Having thus described the present invention with reference to the preferred embodiment, it is to be understood that modifications can be made without departing from the spirit or scope of the invention as defined in the appended claims.

What is claimed is:

1. An optical fiber shipping and handling package for use with optical fiber jumpers, said package comprising
a sheet of material formed to have two allochiral halves which are joined along a fold line,
each of said halves having mushroom shaped cut-outs arranged in a circular array with said array having a diameter exceeding twice the bend radius for optical fibers, said cut-outs affording the wrapping of a length of optical fiber spirally on both halves with a connector at each end, and
said halves each having a recess communicating with the recess in the other half and extending across said fold line to permit a said length of optical fiber to extend across the fold line and to be readily cut to separate a said optical fiber wound thereon into two pigtails.

2. The package of claim 1 wherein said mushroom-shaped cut-outs are each formed by two spaced circular holes of equal size and a slit cut through the sheet of material and forming an arc to join the center of said holes.

3. The package of claim 1 wherein said sheet of material is formed with generally circular-shaped allochiral halves joined along a fold line having a length less than one half the radius of either half.

4. The package of claim 3 wherein said sheet material is paperboard.

5. The package of claim 1 wherein said sheet material is paperboard.

6. The package of claim 1 wherein a length of optical fiber is spirally wrapped on one side of each of said halves with an end of the fiber extending from each spiral.

7. The package of claim 1 wherein a length of optical fiber is spirally wrapped on one side of each of said halves, with the fiber passing through said cut-outs and extending across said recess in the halves to the other half, and a connector on each end of the fiber.

8. The package of claim 1 wherein a length of optical fiber is wrapped on the exterior of each of said halves of the blank, with the halves folded along said fold line, and wherein a portion of said optical fiber extends across the recess and connects said lengths of fiber.

9. The package of claim 8 wherein a connector is mounted on one end of each length of optical fiber.

* * * * *